(12) United States Patent
Agerstam et al.

(10) Patent No.: US 11,178,017 B2
(45) Date of Patent: Nov. 16, 2021

(54) CREATING A COMPUTING SYSTEM

(71) Applicant: Intel Corporation, Santa Clara, CA (US)

(72) Inventors: Mats Gustav Agerstam, Portland, OR (US); Douglas K Hudson, Beaverton, OR (US); Shilpa A Sodani, Portland, OR (US); Vijay Sarathi Kesavan, Portland, OR (US); Thuyen C Tran, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/608,758

(22) PCT Filed: May 9, 2017

(86) PCT No.: PCT/US2017/031733
§ 371 (c)(1),
(2) Date: Oct. 25, 2019

(87) PCT Pub. No.: WO2018/208286
PCT Pub. Date: Nov. 15, 2018

(65) Prior Publication Data
US 2020/0195514 A1    Jun. 18, 2020

(51) Int. Cl.
*H04L 12/24* (2006.01)
*G06N 7/00* (2006.01)
(Continued)

(52) U.S. Cl.
CPC ............. *H04L 41/12* (2013.01); *G06N 7/005* (2013.01); *H04L 67/12* (2013.01); *G16Y 10/75* (2020.01)

(58) Field of Classification Search
CPC ......... H04L 41/12; H04L 67/12; G06N 7/005; G16Y 10/75
(Continued)

(56) References Cited

U.S. PATENT DOCUMENTS

| 2013/0159550 A1 | 6/2013 | Vasseur |
| 2013/0215942 A1* | 8/2013 | Addepalli ............... H04L 1/007 375/224 |

(Continued)

FOREIGN PATENT DOCUMENTS

| DE | 112017007523 | 2/2020 |
| WO | WO-2018208286 A1 | 11/2018 |

OTHER PUBLICATIONS

"International Application Serial No. PCT US2017 031733, International Preliminary Report on Patentability dated Nov. 21, 2019", 9 pgs.

(Continued)

Primary Examiner — David R Lazaro
Assistant Examiner — Zia Khurshid
(74) Attorney, Agent, or Firm — Schwegman Lundberg & Woessner, P.A.

(57) ABSTRACT

Disclosed is an environment including a device (105) for creating a computing system. The device (105) includes circuitry (120), a first network interface (110), and a second network interface (115). The device (105) may be a gateway. The processing circuitry (120) is arranged to receive a system definition pertaining to a first network. The first network may include OCF clients (140), such as a home automation control panel (140B) or a remote monitor (140A). The OCF clients (140) may communicate to the device (105) using OCF conventions. The system definition includes function identifiers and pertains to the first network.

(Continued)

The system definition parameterizes the functions via the function identifiers of the system. Preferably, the first network operates in accordance with the OCF (Open Connectivity Foundation) family of standards. The system definition may be an OCF collection. Here, the function identifiers include the resources linked or batched by the OCF collection. The device (105) may operate as an OCF server. The processing circuitry (120) is also arranged to obtain an organizational element based on the system definition. Here, the organizational element pertains to the second network that uses the organizational element to self-organize. In an example, the second network operates in accordance with a IEEE 802.15.4e family of standards. For example, the system definition may be used as a key for the processing circuitry to lookup an RPL (Routing Protocol for Low-Power and Lossy Networks) instance. The RPL instance may include an objective function which accepts environmental parameters of a node and provides a ranking of other nodes to attach as parents in a Destination-Oriented Directed Acyclic Graph (DODAG). The processing circuitry (120) is arranged to propagate the organizational element to the second network to modify the topology of the second network to create a system of nodes (130) in the second network in accordance with the system definition. The processing circuitry (120) is arranged to receive a request from the first network for the system and fulfill the request by interacting with the nodes (130). Thus, the system may be queried by the OCF clients (140) via the OCF device (105).

24 Claims, 11 Drawing Sheets

(51) Int. Cl.
*H04L 29/08* (2006.01)
*G16Y 10/75* (2020.01)

(58) Field of Classification Search
USPC .......................................................... 709/223
See application file for complete search history.

(56) References Cited

U.S. PATENT DOCUMENTS

| | | |
|---|---|---|
| 2016/0026542 A1 | 1/2016 | Vasseur et al. |
| 2017/0242674 A1* | 8/2017 | Hussein .................... G06F 8/61 |
| 2017/0310691 A1* | 10/2017 | Vasseur ............... H04L 63/1458 |

OTHER PUBLICATIONS

"International Application Serial No. PCT/US2017/031733, International Search Report dated Nov. 16, 2017", 5 pgs.

"International Application Serial No. PCT/US2017/031733, Written Opinion dated Nov. 16, 2017", 10 pgs.

Park, Soohong, "OCF: A New Open IoT Consortium", 31st International Conference on Advanced Information Networking and Applications Workshops (WAINA), IEEE,, (Mar. 27, 2017), 356-359.

\* cited by examiner

CREATING A COMPUTING SYSTEM

PRIORITY APPLICATION

This application is a U.S. National Stage Application under 35 U.S.C. 371 from International Application No. PCT/US2017/031733, filed May 9, 2017, published as WO 2018/208286, which is incorporated herein by reference in its entirety.

TECHNICAL FIELD

Embodiments described herein generally relate to computer networks and more specifically to creating a computing system.

BACKGROUND

The internet-of-things (IoT) refers to devices and communication networks to connect a multitude of devices, many of which were previously unconnected. Examples may include sensor arrays, control systems, appliances, building automation systems, among others. The Open Connectivity Foundation (OCF) is a standards body promulgating communications protocols to facilitate a variety of IoT deployments. The OCF family of standards defines application layer communication endpoints, object (e.g., data) definitions, discovery and security procedures to allow the exchange of data between IoT devices and services.

A variety of techniques may be used to provide the physical layer connectivity of IoT deployments. Although wired techniques, such as Ethernet, are possible. IoT deployments generally employ wireless technologies to ease deployment placements and costs. An example wireless technology used in some IoT deployments operates in accordance with an IEEE 802.15.4 family of standards. This technology allows for a variety of efficient (e.g., low power) self-organizing networks. IEEE 802.15.4e is a variation permitting high device deployment densities, which allows for dense sensor networks to support the next generation of connected systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
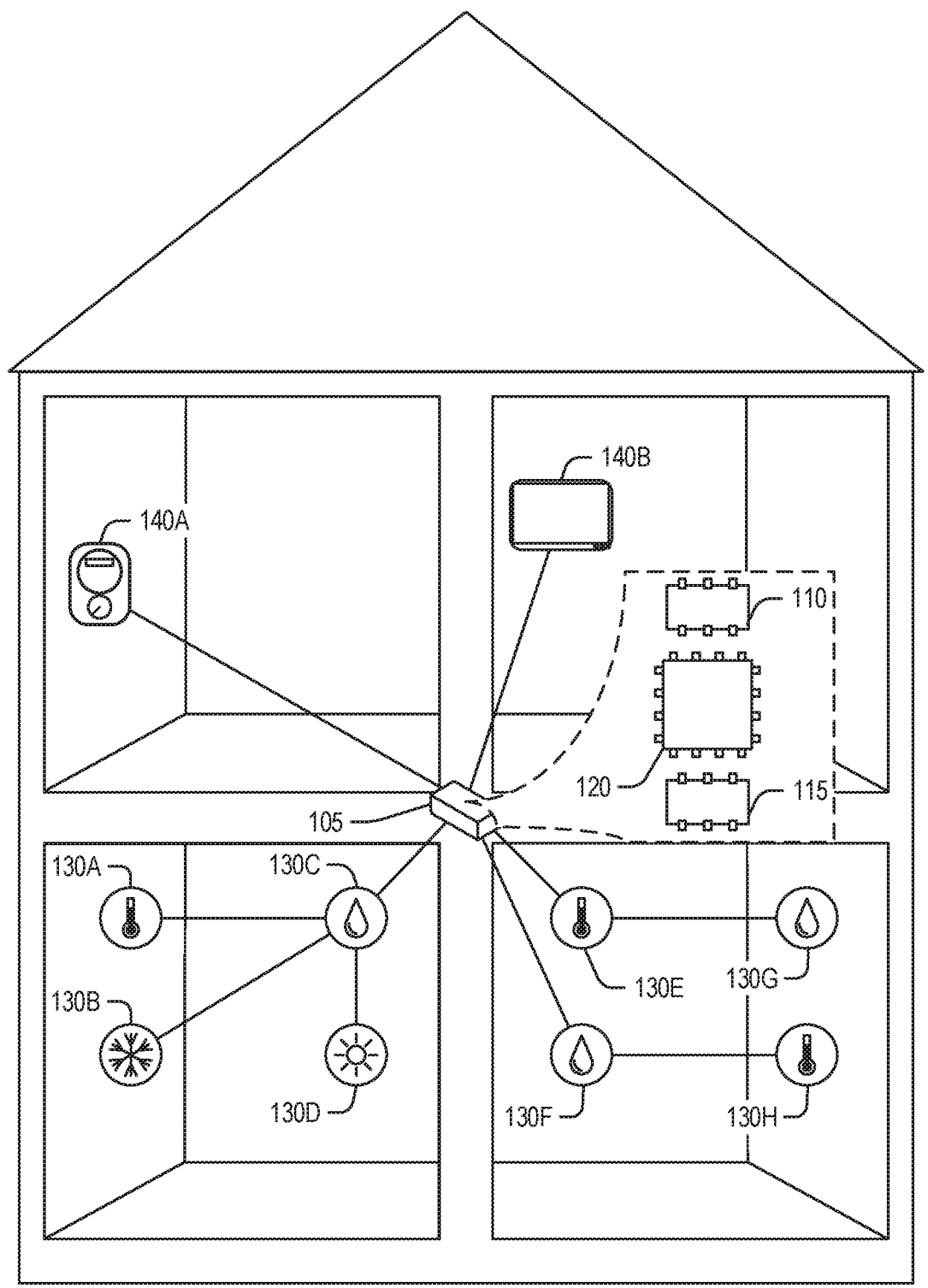
FIG. 1 is a block diagram of an example of an environment including a device for creating a computing system, according to an embodiment.

The IoT ecosystem is rapidly converging towards standards in multiple vertical segments that will facilitate interoperability, new classes of service, and revenue streams to this market. However, there remain gaps to be filled to realize this convergence. IEEE 802.15.4 technology will continue to grow its momentum in several domains, but perhaps one of the biggest areas is the Industrial IoT (IIoT) space. The IEEE 802.15.4e specification permits dense sensor deployments in a way that was not previously feasible due to the use of Time-Slotted Channel Hopping (TSCH). A common communication pattern in an 802.15.4 networks is a tree where commands flow downward from a coordinator (e.g., root) to nodes (e.g., motes) and data flows upward toward the coordinator.

OCF provides clear semantics around discovery, connectivity, data modeling and security. OCF collections provide an abstraction between OCF clients and OCF servers (e.g., sensors or other data providers) in which multiple devices may be accessed by a single endpoint. The OCF device managing the OCF group receives requests on behalf of the group and obtains data from its members to fulfill the requests. What is needed is an implementation of the collection pattern (for OCF collections or collections of other protocols) leveraging the design of 802.15.4 networks.

The OCF Collection feature allows a collection resource to contain links to other OCF resources, forming a group. Collections may be accessed via the OCF links list interface to get a listing of the hosted links or the OCF batch interface to collectively interact with the resources. In an example, the OCF Collection may be implemented in an 802.15.4 network by a device operating as both an OCF Server and as gateway (e.g., intermediary) to the 802.15.4 network. The gateway may employ IPv6 Routing Protocol for Low Power and Lossy Networks (RPL) to form routing paths based on the nodes within the collection. For example, OCF collections may be mapped to RPL Instances with unique objective functions running on the nodes. Generally, an 802.15.4 coordinator uses RPL to organize the nodes of the network. As part of RPL, the objective function may be transmitted to the nodes. The nodes use the objective function to evaluate parent node options and select a single parent for the node. Because each node has a single parent that leads to the coordinator, a tree is formed. By changing the objective function, the topology of the network may also be changed. Again, the objective function takes network metrics of reachable nodes as an input and ranks the reachable nodes. A node executing the objective function may select a highest rank reachable node from the objective function output as a parent node. Thus, node groupings conforming to OCF collections may be implemented in an 802.15.4 topology via the objective function. Thus, OCF groupings may be mapped to RPL instances with objective functions that correspond to a desired topology for the group.

Increased battery life, increased spectral efficiency, and reduced network traffic are some of the benefits obtainable via mapping of OCF collections to 802.15.4 network topologies. Further, the OCF gateway provides a simplified command and response interface to the sensor nodes from OCF clients when hosting the OCF collection that includes 802.15.4 nodes. Additional details and examples are provided below.

FIG. 1 is a block diagram of an example of an environment including a device 105 for creating a computing system, according to an embodiment. The device 105 may include circuitry 120, a first network interface 110, and a second network interface 115. The components of the device 105 are implemented in computer hardware such as that described below. The device 105 may be termed a gateway (e.g., intermediary, bridge) device.

The processing circuitry 120 is arranged to receive a system definition. The system definition pertains to a first network accessible to the processing circuitry via the first network interface 110. In an example, the system definition includes function identifiers and pertains (e.g., is relevant to, defined in terms or in accordance to) to the first network. The system definition parameterizes the functions via the function identifiers of the system. It is indifferent as to implementation. Thus, the system definition will be equally satisfied if one device, or several devices comprise the resultant system if the functions specified by the function identifiers are implemented.

In an example, the first network operates in accordance with an OCF family of standards. In an example, the system definition is an OCF collection. Here, the function identifiers include the resources linked or batched by the OCF collection. In an example, the device 105 operates as an OCF server. Thus, the first network may include OCF clients 140, such as a home automation control panel 140B or a remote monitor 140A (e.g., a utility meter, security system, etc.). Thus, the OCF clients 140 may communicate to the device 105 using OCF conventions. In an example, the device 105 is an OCF gateway.

The processing circuitry 120 is also arranged to obtain (e.g., receive, retrieve, create, etc.) an organizational element based on the system definition. Here, the organizational element pertains to the second network that uses the organizational element to self-organize. In an example, the second network operates in accordance with a IEEE 802.15.4e family of standards. In an example, the second network uses a self-organizing facility that uses RPL. In an example, to obtain the organizational element based on the system definition, the processing circuitry 120 is arranged to obtain a RPL instance that corresponds to the system definition. For example, the system definition may be used as a key for the processing circuitry to lookup the RPL instance. In an example, the processing circuitry 120 is arranged to create the RPL instance.

In an example, the RPL instance includes an objective function. Again, the objective function accepts environmental (e.g., network or node 130) parameters of a node 130 and provides a ranking of other nodes 130 to attach as parents in a Destination-Oriented Directed Acyclic Graph (DODAG).

In an example, nodes 130 that are not in the system are included in the DODAG. This example illustrates that that the DODAG may include additional elements, such as may be required for communication. Thus, if node 130C is not in the system, but is necessary to allow node 130B, which is in the system, to communicate to the DODAG root (e.g., device 105), then node 130C is included in the DODAG. In an example, a node 130 that is in the system is in multiple DODAGs. This example illustrates that node membership to a DODAG need not be exclusive. Thus, a single node 130 may be part of several DODAGs and thus systems at the same time, or over time. In an example, the objective function prioritizes at least one of power conservation or traffic congestion mitigation.

The processing circuitry 120 is arranged to propagate the organizational element to the second network to modify the topology of the second network to create a system of nodes in the second network in accordance with the system definition. Thus, a system is created from the nodes 130. Modifying the topology of the second network allows for system functions to be carried out without interference from non-system nodes 130. In an example, to propagate the organizational element to the second network, the processing circuitry 120 is arranged to communicate (e.g., via the second network interface 115) a DODAG Information Object (DIO) to the second network. In an example, the DIO includes a DIO option field that includes a group parameter. In an example, the group parameter is used by an objective function in a node 130 to ascertain other nodes 130 with a same group.

The processing circuitry 120 is arranged to receive a request from the first network for the system and fulfill the request by interacting with the nodes 130. Thus, after the system is created from the nodes, the system may be queried by the OCF clients 140 via an OCF gateway (e.g., device 105).

Figure 2:
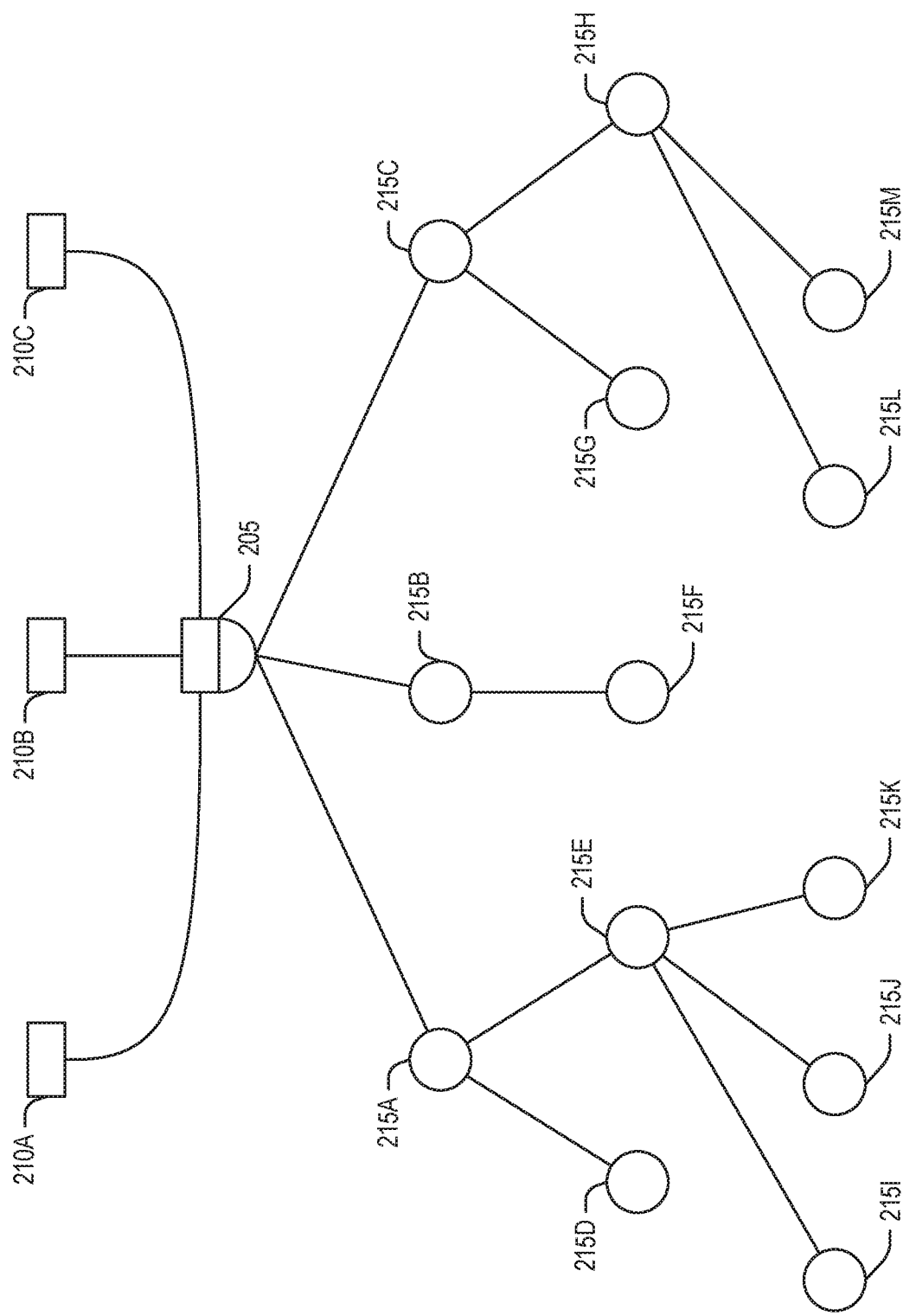
FIG. 2 illustrates an example topology of a first network and a second network joined by a gateway, according to an embodiment.

FIG. 2 illustrates an example topology of a first network and a second network joined by a gateway 205, according to an embodiment. Here, the first network operates in accordance with an OCF family of standards and the second network operates in accordance with an 802.15.4 family of standards. Thus, includes OCF clients 210 (e.g., data consumers) and the second network includes nodes 215.

As noted above, an OCF collection resource holds references to other resources (e.g., child resources). An OCF client 210A may issue a single PUT or GET command to the collection resource and have the command replicated to all the child resources within the collection. Multiple collection resources may be hosted on the same device (e.g., the gateway 205) and a child resource may be a member of multiple OCF collections. Although the child resources in a collection may not be related (e.g., by function, type, location, etc.) to one another, it is often useful group logically related sensors into collections.

In 802.15.4 networks. RPL is used to create routing paths between the nodes 215. Routing topology is represented by a DODAG. As illustrated, the DODAG root is the gateway 205. Multiple DODAGs may exist that enable routing from various nodes 215 to the DODAG root 205. These routes may be optimized for different performance characteristics, such as reducing or minimizing the number of hops to reach the DODAG root 205, increasing data throughput, reducing energy consumption, reducing latency, etc.

RPL uses an objective function (OF) to define the routing metrics that each node 215 uses to determine its parent node. Thus, modifying the OF allows control over routing optimizations. A RPL Instance includes one or more DODAGs with a common OF. RPL uses a control message called a DIO to convey the RPL Instance and other information to the nodes 215. Each node 215 uses the RPL Instance identifier (ID) and the Objective Code Point (OCP) contained in the DIO and DIO Configuration Option, respectively, to determine its RPL Instance and OF. The node 215 then uses the RPL ID and the OCP to determine its parent. Thus, the DIO is used by the nodes to determine their upward routing to the DODAG root 205. RPL uses another control message, a DAO including a RPL instance ID, to determine downward (e.g., root to leaf) routing.

Figure 3:
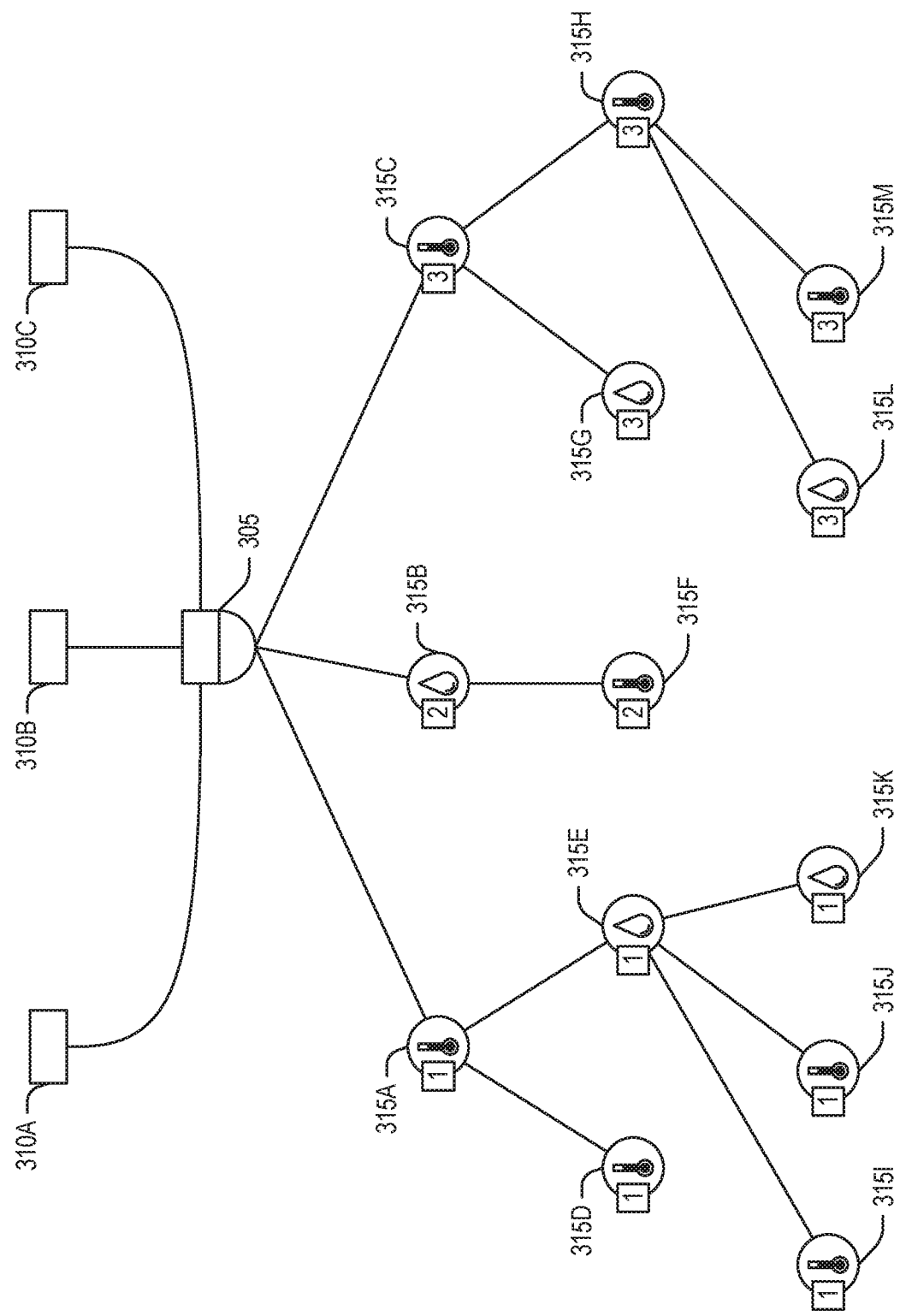
FIG. 3 illustrates an example topology of a first network and a second network joined by a gateway, according to an embodiment.

FIG. 3 illustrates an example topology of a first network and a second network joined by a gateway, according to an embodiment. The generic network topology of FIG. 2 is here replicated with OCF clients 310, 802.15.4 nodes 315, and gateway 305. The nodes 315 are further illustrated as being a thermometer (e.g., nodes 315A, 315C, 315D, 315F, 315H, 315I, 315J, and 315M) or hygrometer (e.g., nodes 315B, 315E, 315G, 315K, and 315L), although other sensors and devices may be used. Further, the nodes 315 have a numerical location label denoting, for example, a co-location in a room. Thus, nodes 315A, 315D, 315E, 315I, 315J, and 315K are in room 1; nodes 315B and 315F are in room 2; and nodes 315C, 315G, 315H, 315L, and 315M are in room 3.

An OCF collection may be mapped to a RPL Instance. In an example, an OF associated with the RPL Instance may be constructed to implement a DODAG that contains only the nodes 315 that are members of the collection. It is possible for nodes 315 a part of several RPL Instances. As illustrated, the DODAG is an initial network topology formed at power up.

The gateway 205 may create OCF collection resources and group the nodes 415 accordingly (e.g., by device type or by location). For example, given a goal of two OCF collection resources: one containing only the thermometer nodes 315A, 315C, 315D, 315F, 315H, 315I, 315J, and 315M; and another containing the nodes 315C, 315G, 315H, 315L, and 315M in room 3. The gateway 305 may create a RPL Instance for each collection in which the OF for the first RPL instance would only allow a homogeneous thermometer DODAG to form, and the OF for a the second RPL instance would only allow a room 3 DODAG to form. To initiate the collection resources, the gateway 205 issues DIO messages, with one DIO containing the first RPL instance ID and another DIO containing the second RPL instance ID. These DIO messages communicate the respective OFs to cause the nodes 315 to organize DODAGs that correspond to the respective OCF collections.

DIOs include a DIO option field that may be extended to provide a group parameter. The group parameter is a mechanism that the OF may use to determine reachable nodes 315 that have matching group parameters and use those nodes 315 for upward routing. RPL defines a default OF, OF0, that primarily selects a parent based on node rank (i.e. distance in hops from the DODAG coordinator 305). A collection OF may be implemented by extending OF0 to base a preferred parent on the group parameter. The following pseudo code illustrates an example technique to determine a node's set of preferred parent nodes to create a collection DODAG:

```
N <- node
NeighborNodeSet <- a set of N's neighboring nodes
NN <- a node in NeighborNodeSet
ParentSet <- set of N's likely parent nodes that match
    collection criteria
For each NN in NeighborNodeSet:
```

-continued

```
If
    (N.Rank < NN.Rank)
    AND
    (N.GroupParameter = = NN.GroupParameter)
THEN
    ParentSet = ParentSet.append(NN)
Return ParentSet
```

Figure 4:
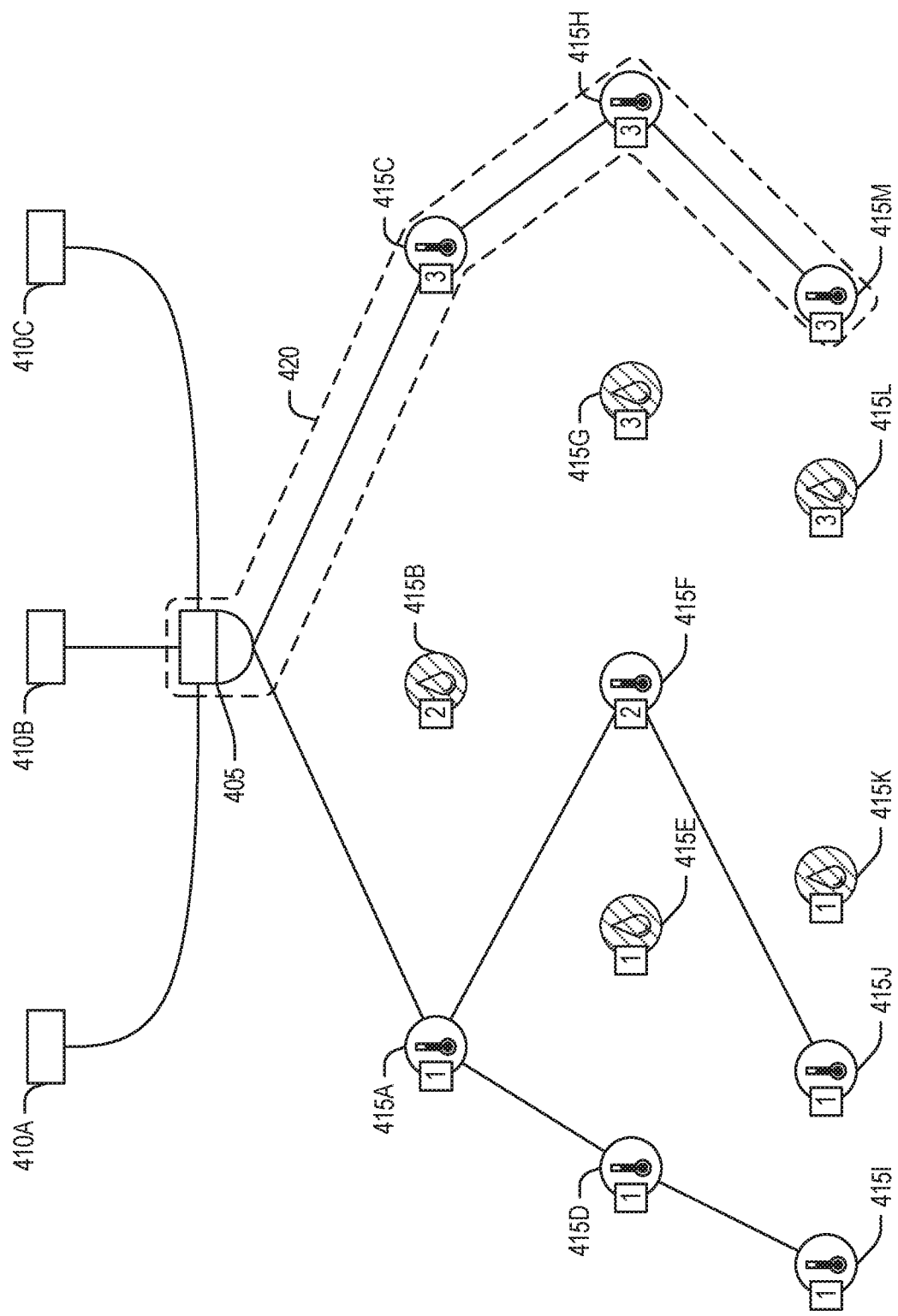
FIG. 4 illustrates an example topology of a first network and a second network joined by a gateway, according to an embodiment.
Figure 5:
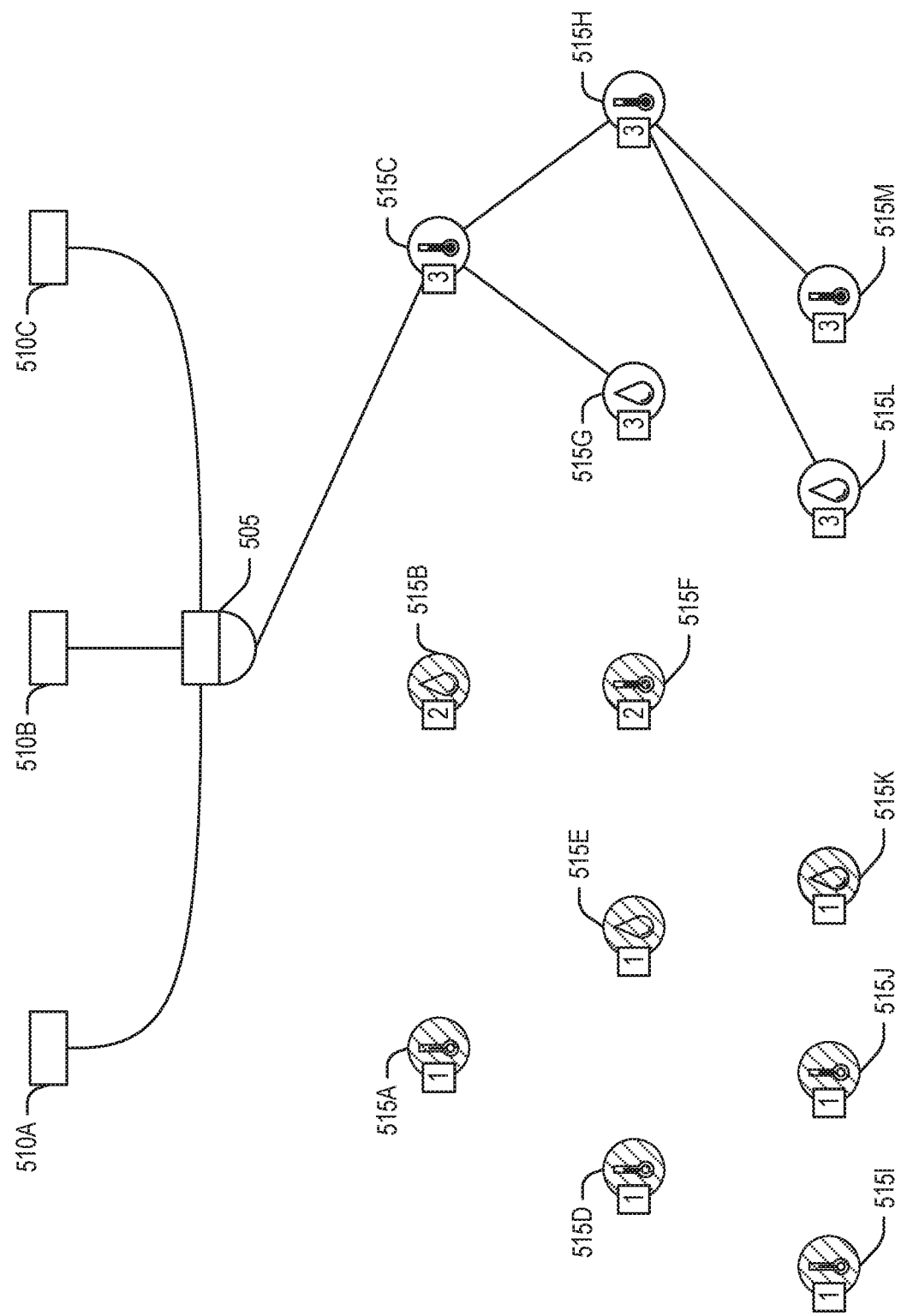
FIG. 5 illustrates an example topology of a first network and a second network joined by a gateway, according to an embodiment.

An example of a topology formed by a RPL instance that implements the OCF collection of thermometers is illustrated in FIG. 4. In this example, the extended DIO Option field may contain a group parameter of "Temperature Sensor". An example of a topology formed by a RPL instance that implements the OCF collection of nodes 315 in room 3 is shown in FIG. 5. In this example, the extended DIO Option field may contain a group parameter of "Room 3".

In an example, the DAO Option Field may be used to convey information about a given node 315, such as device (e.g., sensor) type or location, to the DODAG root (e.g., the gateway 305). The gateway may use this knowledge of the nodes 315 to form collection resources. Similarly, in an example, the DIO Option Field may be used to map OFs pre-programmed on the nodes 315 to the RPL instance OF. This would allow for dynamic re-mapping of the OF to provide different DODAG topologies.

By implementing the devices and techniques described herein, an increase in battery life or an increase in spectral efficiency may be achieved by reducing network traffic. Network traffic is reduced because only nodes 315 that are part of the OCF collection are part of the DODAG, and thus nodes 315 that are not in the collection do relay messages. To satisfy the queries to the collection. Additionally, using RPL instances to implement OCF collections permit both static OCF collection resources—for example, where the collection resources are known by the gateway beforehand—and dynamic OCF collection resources—where the collection resources are specified during operation. After using the OCF, or another, discovery mechanism to find nodes 315 that are connected to the gateway 305, the OCF clients 310 may send PUT commands, for example, to the gateway 305 to create collections dynamically.

FIG. 4 illustrates an example topology of a first network and a second network joined by a gateway, according to an embodiment. FIG. 4 is a modification of the network topology of FIG. 3 that includes OCF clients 410, 802.15.4 nodes 415, and gateway 405. The nodes 415 are further illustrated as being a thermometer (e.g., nodes 415A, 415C, 415D, 415F, 415H, 415I, 415J, and 415M) or hygrometer (e.g., nodes 415B, 415E, 415G, 415K, and 415L), although other sensors and devices may be used. Further, the nodes 415 have a numerical location label denoting, for example, a co-location in a room. Thus, nodes 415A, 415D. 415E, 415I, 415J, and 415K are in room 1; nodes 415B and 415F are in room 2; and nodes 415C, 415G, 415H, 415L, and 415M are in room 3. The network topology of FIG. 4 illustrates DODAGs, such as DODAG 410, formed by grouping the nodes 415 by type (e.g., thermometers). The shaded nodes are not included in the illustrated DODAGs.

FIG. 5 illustrates an example topology of a first network and a second network joined by a gateway, according to an embodiment. FIG. 5 is a modification of the network topology of FIG. 3 that includes OCF clients 510. 802.15.4 nodes 515, and gateway 505. The nodes 515 are further illustrated as being a thermometer (e.g., nodes 515A, 515C, 515D, 515F, 515H, 515I, 515J, and 515M) or hygrometer (e.g., nodes 515B, 515E, 515G, 515K, and 515L), although other sensors and devices may be used. Further, the nodes 515 have a numerical location label denoting, for example, a co-location in a room. Thus, nodes 515A, 515D. 515E, 515I, 515J, and 515K are in room 1; nodes 515B and 515F are in room 2; and nodes 515C, 515G, 515H, 515L, and 515M are in room 3. The network topology of FIG. 5 illustrates a DODAG formed by grouping the nodes 515 by location (e.g., room 3). The shaded nodes are not included in the illustrated DODAG.

Figure 6:
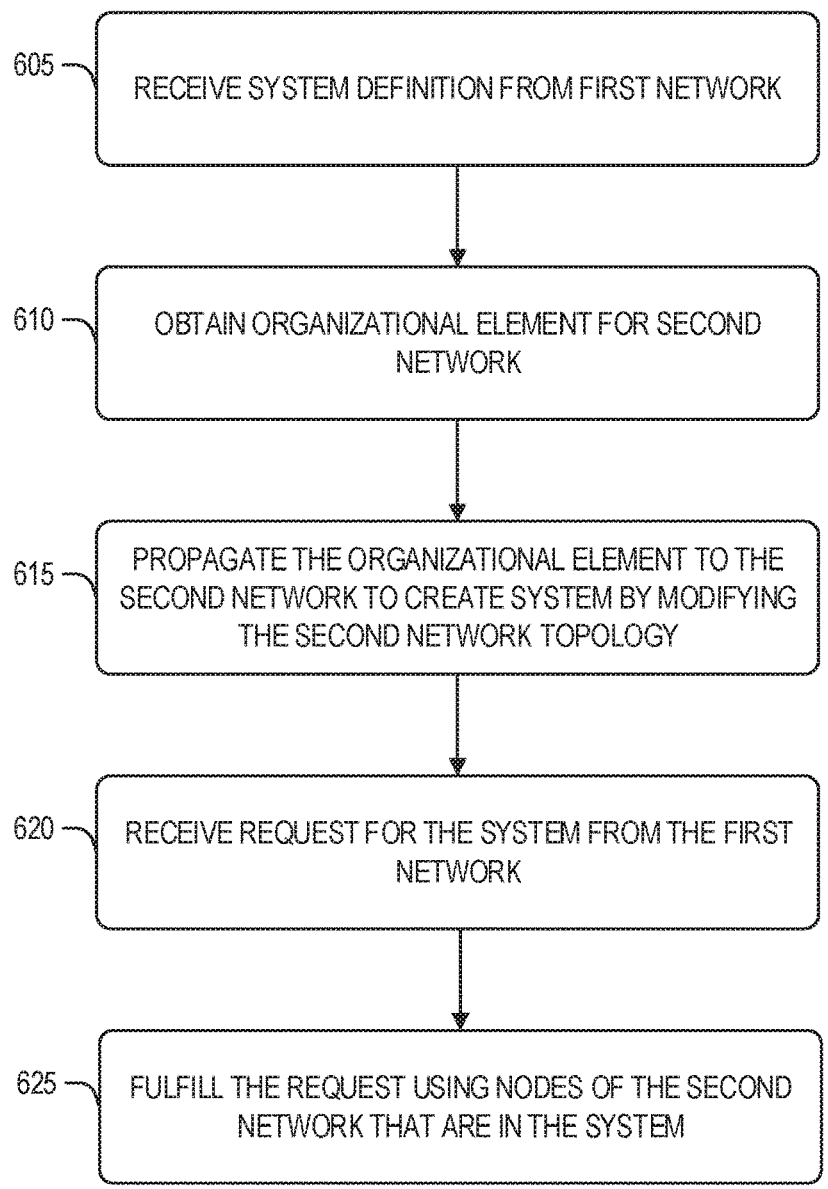
FIG. 6 illustrates an example a method for creating a computing system, according to an embodiment.

FIG. 6 illustrates an example a method 600 for creating a computing system, according to an embodiment. The operations of the method 600 are implemented in electronic hardware, such as that described above and below.

At operation 605, a system definition is received from a first network. In an example, the system definition includes function identifiers. In an example, the first network operates in accordance with an OCF family of standards. In an example, the system definition is an OCF collection. In an example, all operations of the method 600 are performed by a device operating as an OCF server. In an example, the OCF server is an OCF gateway.

At operation 610, an organizational element based on the system definition is obtained. In an example, the organizational element pertains to a second network that is a self-organizing network. In an example, the second network operates in accordance with a IEEE 802.15.4e family of standards. In an example, the second network uses a self-organizing facility that employs RPL. In an example, obtaining the organizational element based on the system definition includes obtaining a RPL instance that corresponds to the system definition. In an example, obtaining the RPL instance includes creating the RPL instance.

In an example, the RPL includes an objective function. In an example, the objective function is arranged to accept environmental parameters of a node and provide a ranking of other nodes to attach as parents in a DODAG. In an example, nodes that are not in the system are included in the DODAG. In an example, a node that is in the system is in multiple DODAGs. In an example, the objective function prioritizes at least one of power conservation or traffic congestion mitigation.

At operation 615, the organizational element is propagated to the second network to modify the topology of the second network to create a system of nodes in the second network in accordance with the system definition. In an example, propagating the organizational element to the second network includes communicating a DIO to the second network. In an example, the DIO includes a DIO option field that includes a group parameter. In an example, the group parameter is used by an objective function in a node to ascertain other nodes with a same group.

At operation 620, a request from the first network for the system is received.

At operation 625, the request is fulfilled by interacting with the nodes of the system in the second network.

Figure 7:
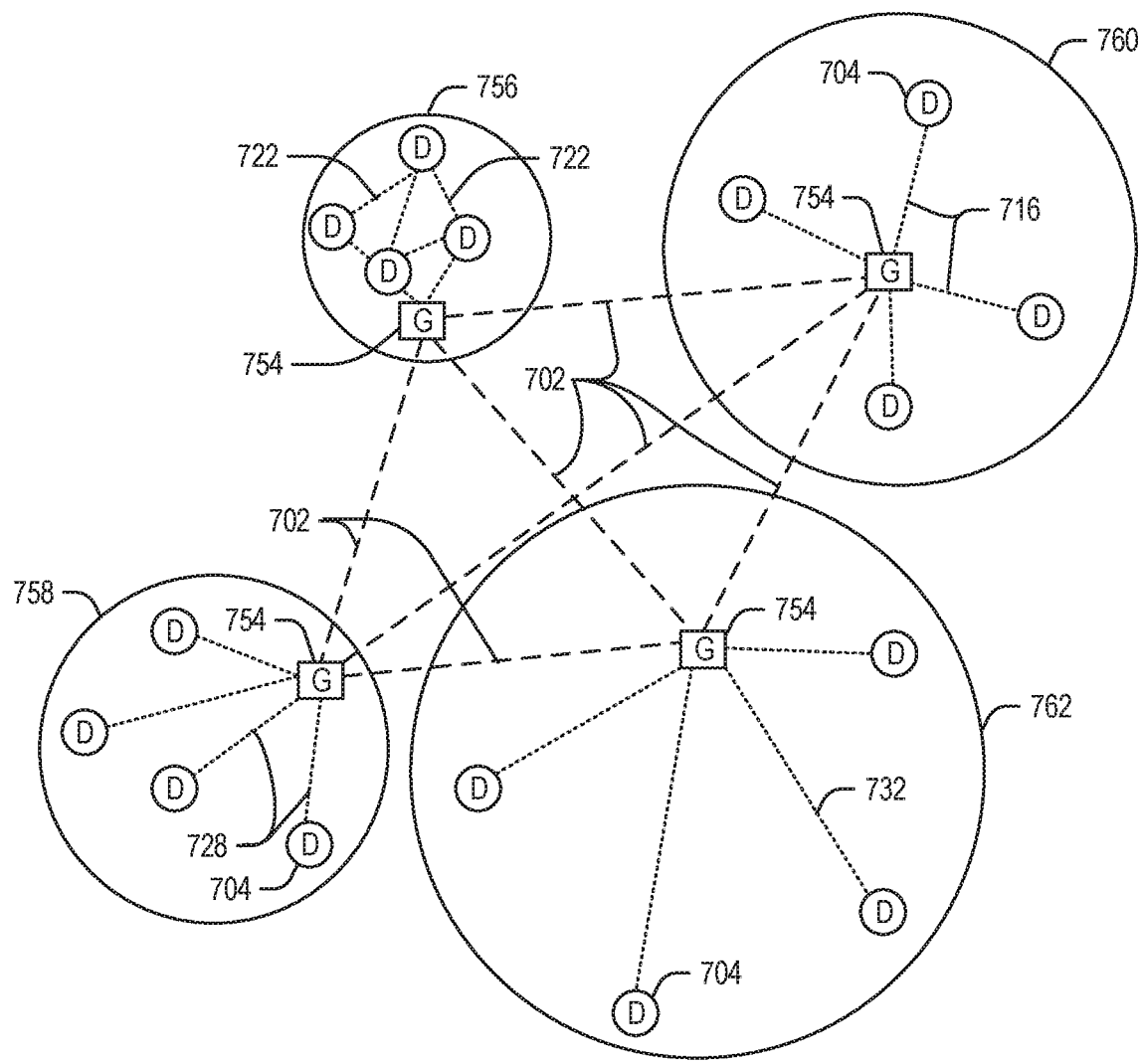
FIG. 7 illustrates a domain topology for respective internet-of-things (IoT) networks coupled through links to respective gateways, according to an embodiment.

FIG. 7 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 7 specifically provides a simplified drawing of a domain topology that may be used for a number of internet-of-things (IoT) networks comprising IoT devices 704, with the IoT networks 756, 758, 760, 762, coupled through backbone links 702 to respective gateways 754. For example, a number of IoT devices 704 may communicate with a gateway 754, and with each other through the gateway 754. To simplify the drawing, not every IoT device 704, or communications link (e.g., link 716, 722, 728, or 732) is labeled. The backbone links 702 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 756 using Bluetooth low energy (BLE) links 722. Other types of IoT networks that may be present include a wireless local area network (WLAN) network 758 used to communicate with IoT devices 704 through IEEE 802.11 (Wi-Fi®) links 728, a cellular network 760 used to communicate with IoT devices 704 through an LTE/LTE-A (4G) or 7G cellular network, and a low-power wide area (LPWA) network 762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 704, such as over the backbone links 702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 758, for instance, may use systems that perform standards conversion to provide multi-standard connectivity, enabling IoT devices 704 using different protocols to communicate. Further systems may provide seamless interconnectivity across a multi-standard infrastructure comprising visible Internet resources and hidden Internet resources.

Communications in the cellular network 760, for instance, may be enhanced by systems that offload data, extend communications to more remote devices, or both. The LPWA network 762 may include systems that perform non-Internet protocol (IP) to IP interconnections, addressing, and routing. Further, each of the IoT devices 704 may include the appropriate transceiver for wide area communications with that device. Further, each IoT device 704 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device.

Figure 8:
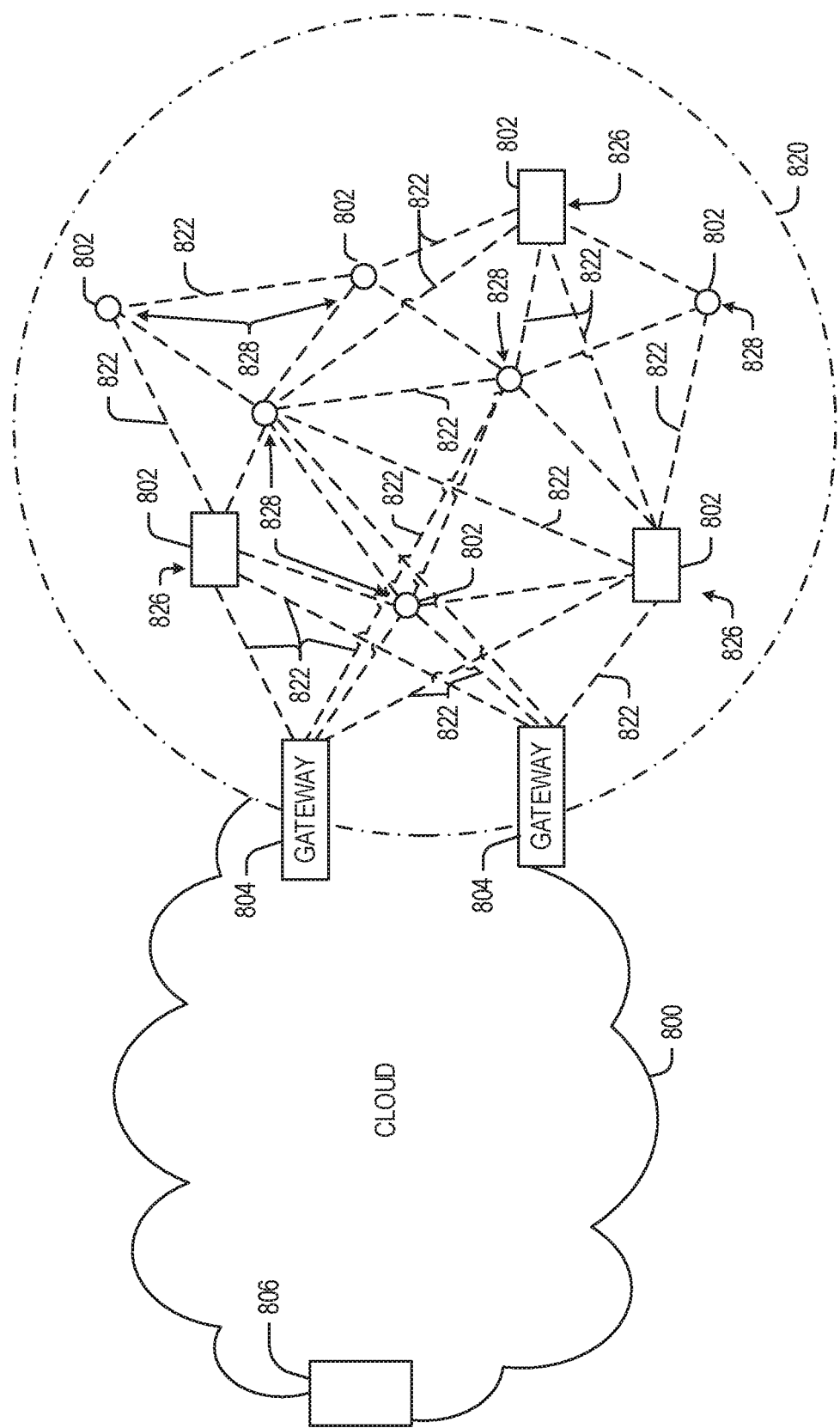
FIG. 8 illustrates a cloud computing network in communication with a mesh network of IoT devices operating as a fog device at the edge of the cloud computing network, according to an embodiment.

FIG. 8 illustrates a cloud computing network in communication with a mesh network of IoT devices (devices 802) operating as a fog device at the edge of the cloud computing network. The mesh network of IoT devices may be termed a fog 820, operating at the edge of the cloud 800. To simplify the diagram, not every IoT device 802 is labeled.

The fog 820 may be considered to be a massively interconnected network wherein a number of IoT devices 802 are in communications with each other, for example, by radio links 822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 802 are shown in this example, gateways 804, data aggregators 826, and sensors 828, although any combinations of IoT devices 802 and functionality may be used. The gateways 804 may be edge devices that provide communications between the cloud 800 and the fog 820, and may also provide the backend process function for data obtained from sensors 828, such as motion data, flow data, temperature data, and the like. The data aggregators 826 may collect data from any number of the sensors 828, and perform the back end processing function for the analysis. The results, raw data, or both may be passed along to the cloud 800 through the gateways 804. The sensors 828 may be full IoT devices 802, for example, capable of both collecting data and processing the data. In some cases, the sensors 828 may be more limited in functionality, for example, collecting the data and allowing the data aggregators 826 or gateways 804 to process the data.

Communications from any IoT device 802 may be passed along the most convenient path between any of the IoT devices 802 to reach the gateways 804. In these networks, the number of interconnections provide substantial redundancy, allowing communications to be maintained, even with the loss of a number of IoT devices 802. Further, the use of a mesh network may allow IoT devices 802 that are very low power or located at a distance from infrastructure to be used, as the range to connect to another IoT device 802 may be much less than the range to connect to the gateways 804.

The fog 820 provided from these IoT devices 802 may be presented to devices in the cloud 800, such as a server 806, as a single device located at the edge of the cloud 800. e.g., a fog device. In this example, the alerts coming from the fog device may be sent without being identified as coming from a specific IoT device 802 within the fog 820. In this fashion, the fog 820 may be considered a distributed platform that provides computing and storage resources to perform processing or data-intensive tasks such as data analytics, data aggregation, and machine-learning, among others.

In some examples, the IoT devices 802 may be configured using an imperative programming style, e.g., with each IoT device 802 having a specific function and communication partners. However, the IoT devices 802 forming the fog device may be configured in a declarative programming style, allowing the IoT devices 8802 to reconfigure their operations and communications, such as to determine needed resources in response to conditions, queries, and device failures. As an example, a query from a user located at a server 806 about the operations of a subset of equipment monitored by the IoT devices 802 may result in the fog 820 device selecting the IoT devices 802, such as particular sensors 828, needed to answer the query. The data from these sensors 828 may then be aggregated and analyzed by any combination of the sensors 828, data aggregators 826, or gateways 804, before being sent on by the fog 820 device to the server 806 to answer the query. In this example, IoT devices 802 in the fog 820 may select the sensors 828 used based on the query, such as adding data from flow sensors or temperature sensors. Further, if some of the IoT devices 802 are not operational, other IoT devices 802 in the fog 820 device may provide analogous data, if available.

Figure 9:
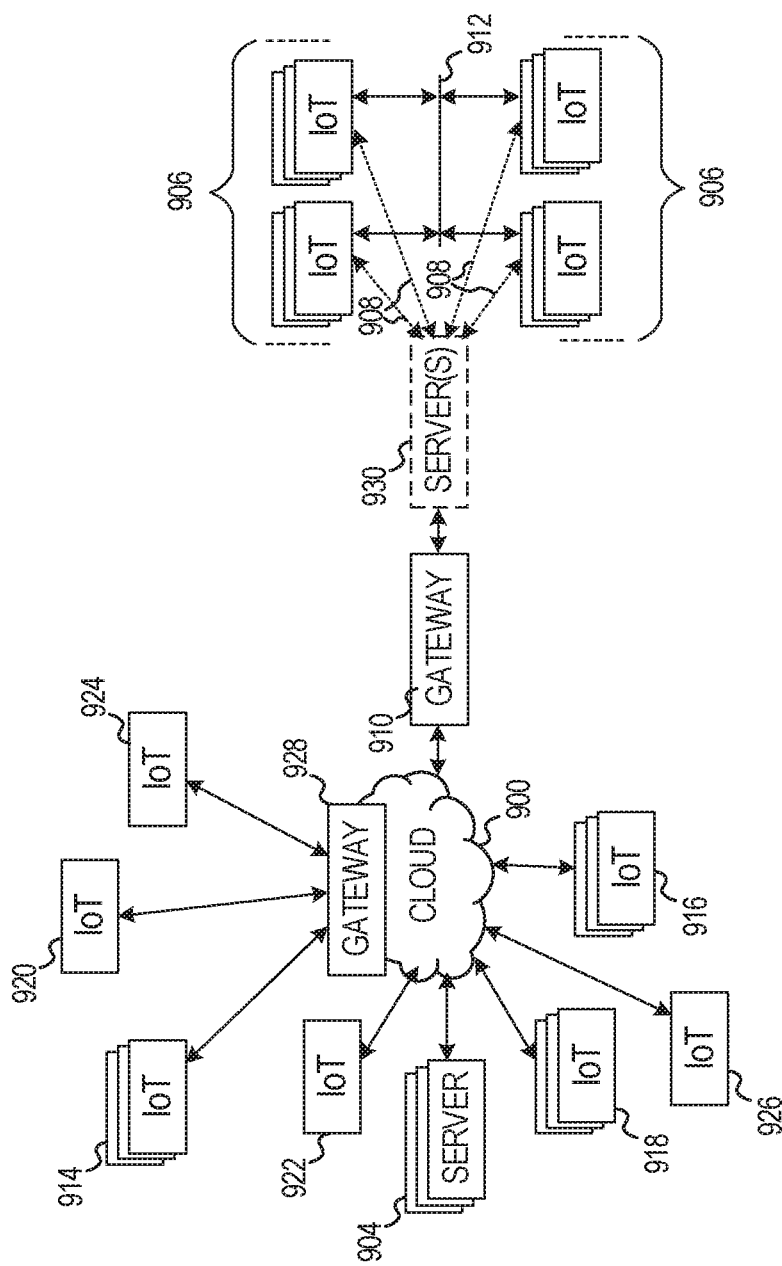
FIG. 9 illustrates a block diagram communications among a number of IoT devices, according to an embodiment.

FIG. 9 illustrates a drawing of a cloud computing network, or cloud 900, in communication with a number of Internet of Things (IoT) devices. The cloud 900 may represent the Internet. or may be a local area network (LAN), or a wide area network (WAN), such as a proprietary network for a company. The IoT devices may include any number of different types of devices, grouped in various combinations. For example, a traffic control group 906 may include IoT devices along streets in a city. These IoT devices may include stoplights, traffic flow monitors, cameras, weather sensors, and the like. The traffic control group 906, or other subgroups, may be in communication with the cloud 900 through wired or wireless links 908, such as LPWA links, optical links, and the like. Further, a wired or wireless sub-network 912 may allow the IoT devices to communicate with each other, such as through a local area network, a wireless local area network, and the like. The IoT devices may use another device, such as a gateway 910 or 928 to communicate with remote locations such as the cloud 900; the IoT devices may also use one or more servers 930 to facilitate communication with the cloud 900 or with the gateway 910. For example, the one or more servers 930 may operate as an intermediate network node to support a local edge cloud or fog implementation among a local area network. Further, the gateway 928 that is depicted may operate in a cloud-to-gateway-to-many edge devices configuration, such as in an assignment of the various IoT devices 914, 920, 924 being constrained or dynamic to an assignment and use of resources in the cloud 900.

Other example groups of IoT devices may include remote weather stations 914, local information terminals 916, alarm systems 918, automated teller machines 920, alarm panels 922, or moving vehicles, such as emergency vehicles 924 or other vehicles 926, among many others. Each of these IoT devices may be in communication with other IoT devices, with servers 904, with another IoT fog device or system, or a combination therein. The groups of IoT devices may be deployed in various residential, commercial, industrial, settings (including both private or public settings).

As may be seen from FIG. 9, a large number of IoT devices may be communicating through the cloud 900. This may allow different IoT devices to request or provide information to other devices autonomously. For example, a group of IoT devices (e.g., the traffic control group 906) may request a current weather forecast from a group of remote weather stations 914, which may provide the forecast without human intervention. Further, an emergency vehicle 924 may be alerted by an automated teller machine 920 that a burglary is in progress. As the emergency vehicle 924 proceeds towards the automated teller machine 920, it may access the traffic control group 906 to request clearance to the location, for example, by lights turning red to block cross traffic at an intersection in sufficient time for the emergency vehicle 924 to have unimpeded access to the intersection.

Clusters of IoT devices, such as the remote weather stations 914 or the traffic control group 906, may be equipped to communicate with other IoT devices as well as with the cloud 900. This may allow the IoT devices to form an ad-hoc network between the devices, allowing them to function as a single device, which may be termed a fog device or system.

Figure 10:
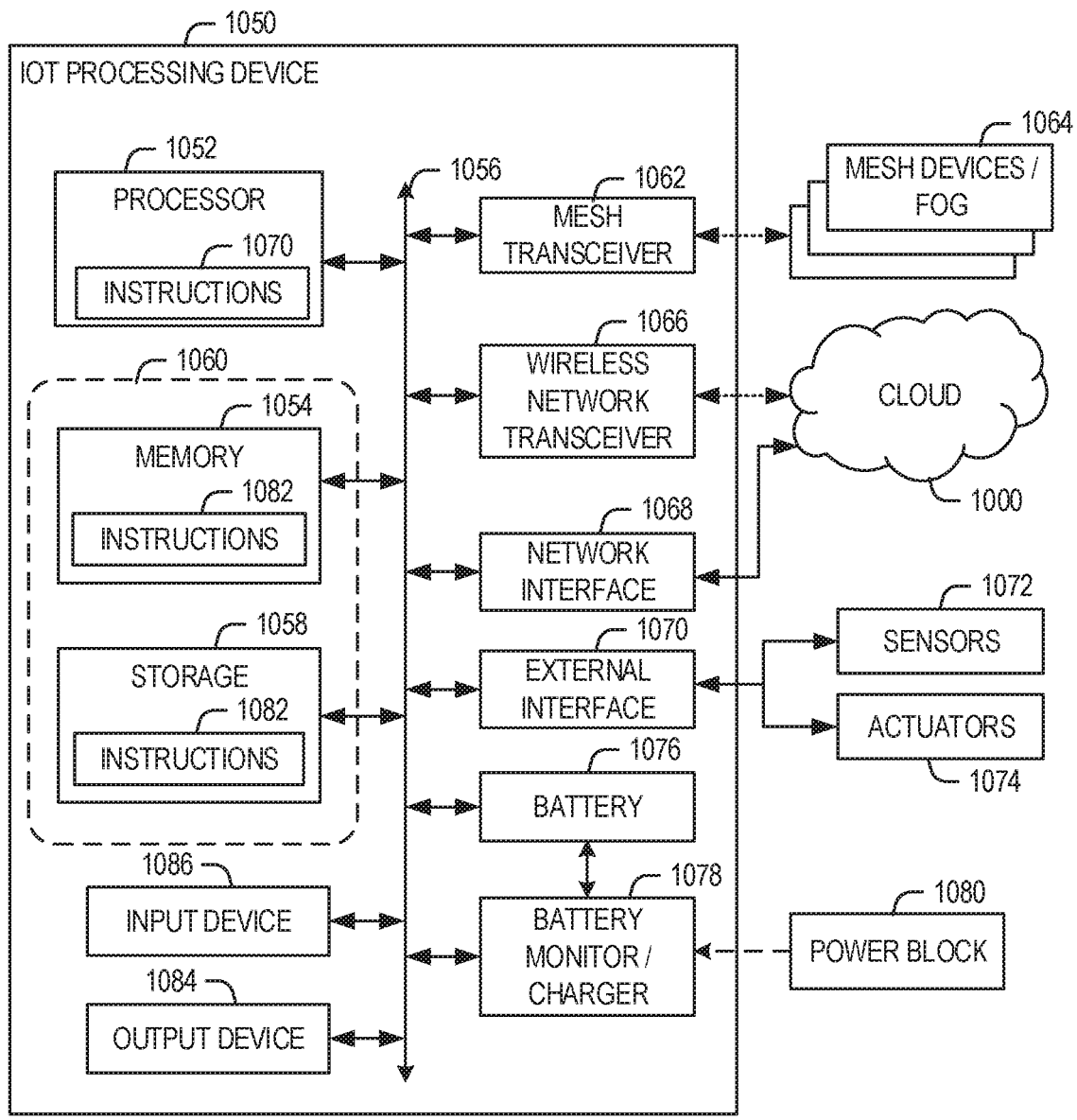
FIG. 10 illustrates a block diagram for an example IoT processing system architecture upon which any one or more of the techniques (e.g., operations, processes, methods, and methodologies) discussed herein may be performed, according to an embodiment.

FIG. 10 is a block diagram of an example of components that may be present in an IoT device 1050 for implementing the techniques described herein. The IoT device 1050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1050, or as components otherwise incorporated within a chassis of a larger system. Additionally, the block diagram of FIG. 10 is intended to depict a high-level view of components of the IoT device 1050. However, some of the components shown may be omitted, additional components may be present, and different arrangement of the components shown may occur in other implementations.

The IoT device 1050 may include a processor 1052, which may be a microprocessor, a multi-core processor, a multithreaded processor, an ultra-low voltage processor, an embedded processor, or other known processing element. The processor 1052 may be a part of a system on a chip (SoC) in which the processor 1052 and other components are formed into a single integrated circuit, or a single package, such as the Edison™ or Galileo™ SoC boards from Intel. As an example, the processor 1052 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif. an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1052 may communicate with a system memory 1054 over an interconnect 1056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR. LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example the storage 1058 may be implemented via a solid state disk drive (SSDD). Other devices that may be used for the storage 1058 include flash memory cards, such as SD cards, microSD cards, xD picture cards, and the like, and USB flash drives. In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in a SoC based system. Other bus systems may be included, such as an I2C interface, an SPI interface, point to point interfaces, and a power bus, among others.

The interconnect 1056 may couple the processor 1052 to a mesh transceiver 1062, for communications with other mesh devices 1064. The mesh transceiver 1062 may use any number of frequencies and protocols, such as 2.4 Gigahertz (GHz) transmissions under the IEEE 1002.15.4 standard, using the Bluetooth® low energy (BLE) standard, as defined by the Bluetooth® Special Interest Group. or the ZigBee® standard, among others. Any number of radios, configured for a particular wireless communication protocol, may be used for the connections to the mesh devices 1064. For example, a WLAN unit may be used to implement Wi-Fi™ communications in accordance with the Institute of Electrical and Electronics Engineers (IEEE) 1002.11 standard. In addition, wireless wide area communications, e.g., according to a cellular or other wireless wide area protocol may occur via a WWAN unit.

The mesh transceiver 1062 may communicate using multiple standards or radios for communications at different range. For example, the IoT device 1050 may communicate with close devices, e.g., within about 10 meters, using a local transceiver based on BLE, or another low power radio, to save power. More distant mesh devices 1064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1066 may be included to communicate with devices or services in the cloud 1000 via local or wide area network protocols. The wireless network transceiver 1066 may be a LPWA transceiver that follows the IEEE 1002.15.4, or IEEE 1002.15.4g standards, among others. The IoT device 1050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 1002.15.4e specification may be used.

Any number of other radio communications and protocols may be used in addition to the systems mentioned for the mesh transceiver 1062 and wireless network transceiver 1066, as described herein. For example, the radio transceivers 1062 and 1066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1062 and 1066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1068 may be included to provide a wired communication to the cloud 1000 or to other devices, such as the mesh devices 1064. The wired communication may provide an Ethernet connection, or may be based on other types of networks, such as Controller Area Network (CAN). Local Interconnect Network (LIN), DeviceNet, ControlNet, Data Highway+, PROFIBUS, or PROFINET, among many others. An additional NIC 1068 may be included to allow connect to a second network, for example, a NIC 1068 providing communications to the cloud over Ethernet, and a second NIC 1068 providing communications to other devices over another type of network.

The interconnect 1056 may couple the processor 1052 to an external interface 1070 that is used to connect external devices or subsystems. The external devices may include sensors 1072, such as accelerometers, level sensors, flow sensors, optical light sensors, camera sensors, temperature sensors, a global positioning system (GPS) sensors, pressure sensors, barometric pressure sensors, and the like. The external interface 1070 further may be used to connect the IoT device 1050 to actuators 1074, such as power switches, valve actuators, an audible sound generator, a visual warning device, and the like.

In some optional examples, various input/output (I/O) devices may be present within, or connected to, the IoT device 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1050.

A battery 1076 may power the IoT device 1050, although in examples in which the IoT device 1050 is mounted in a fixed location, it may have a power supply coupled to an electrical grid. The battery 1076 may be a lithium ion battery, or a metal-air battery, such as a zinc-air battery, an aluminum-air battery, a lithium-air battery, and the like.

A battery monitor/charger 1078 may be included in the IoT device 1050 to track the state of charge (SoCh) of the battery 1076. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 1078 may communicate the information on the battery 1076 to the processor 1052 over the interconnect 1056. The battery monitor/charger 1078 may also include an analog-to-digital (ADC) convertor that allows the processor 1052 to directly monitor the voltage of the battery 1076 or the current flow from the battery 1076. The battery parameters may be used to determine actions that the IoT device 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the IoT device 1050. A wireless battery charging circuit, such as an LTC4020 chip from Linear Technologies of Milpitas, Calif., among others, may be included in the battery monitor/charger 1078. The specific charging circuits chosen depend on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine readable medium 1060 including code to direct the processor 1052 to perform electronic operations in the IoT device 1050. The processor 1052 may access the non-transitory, machine readable medium 1060 over the interconnect 1056. For instance, the non-transitory, machine readable medium 1060 may be embodied by devices described for the storage 1058 of FIG. 10 or may include specific storage units such as optical disks, flash drives, or any number of other hardware devices. The non-transitory, machine readable medium 1060 may include instructions to direct the processor 1052 to perform a specific sequence or flow of actions.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 11:
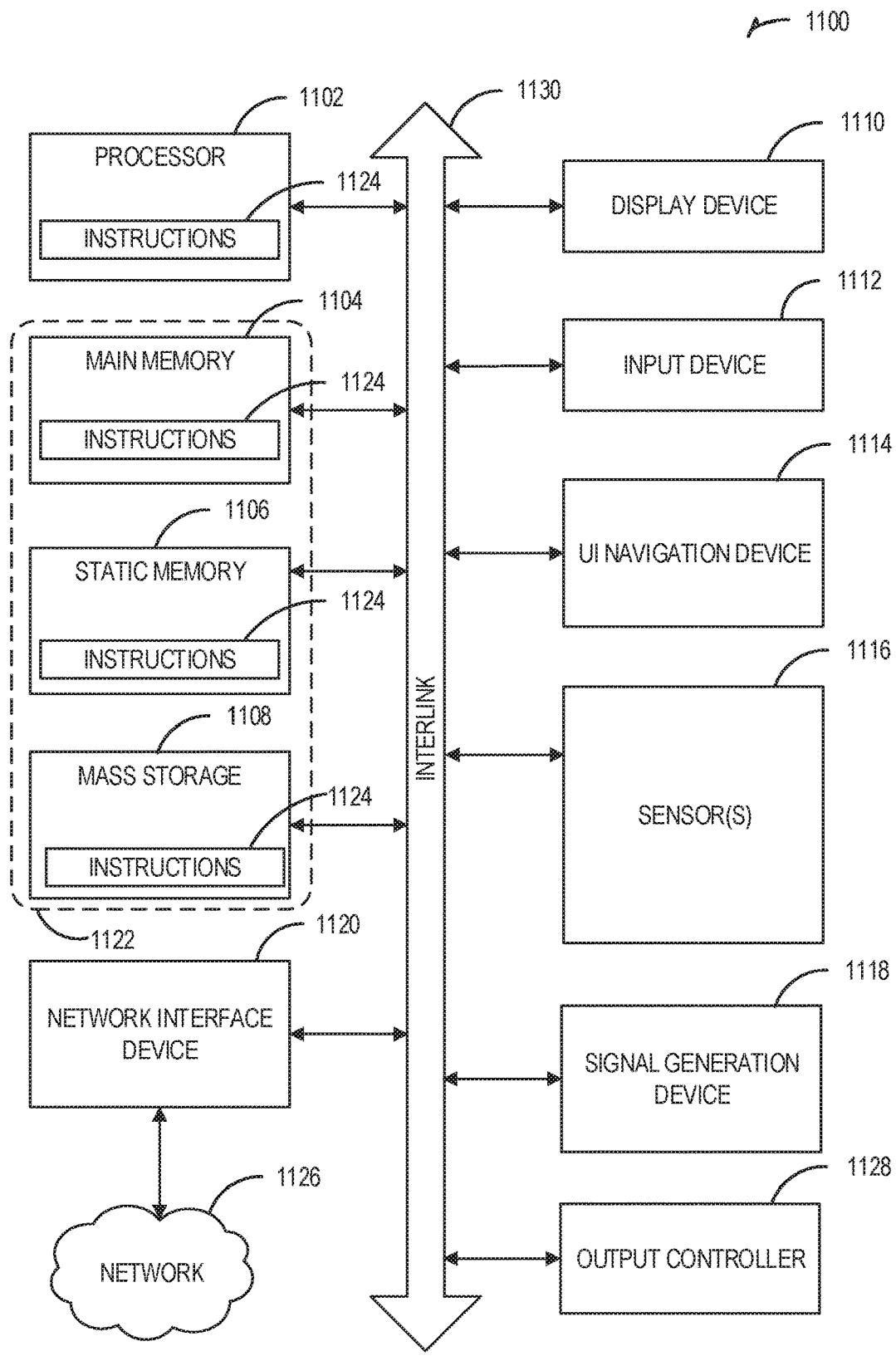
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. Examples, as described herein, may include, or may operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

ADDITIONAL NOTES & EXAMPLES

Example 1 is a device for creating a computing system, the device comprising processing circuitry to: receive a system definition, the system definition including function identifiers and pertaining to a first network; obtain an organizational element based on the system definition, the organizational element pertaining to a second network that is a self-organizing network; propagate the organizational element to the second network to modify the topology of the second network to create a system of nodes in the second network in accordance with the system definition; receive a request from the first network for the system; and fulfill the request by interacting with the nodes.

In Example 2, the subject matter of Example 1 optionally includes Routing Protocol for Low-Power and Lossy Networks (RPL).

In Example 3, the subject matter of Example 2 optionally includes wherein, to obtain the organizational element based on the system definition, the processing circuitry obtains a RPL instance that corresponds to the system definition.

In Example 4, the subject matter of Example 3 optionally includes wherein, to obtain the organizational element based on the system definition, the processing circuitry creates the RPL instance.

In Example 5, the subject matter of any one or more of Examples 3-4 optionally include wherein the RPL includes an objective function, the objective function accepting environmental parameters of a node and providing a ranking of other nodes to attach as parents in a Destination-Oriented Directed Acyclic Graph (DODAG).

In Example 6, the subject matter of Example 5 optionally includes wherein nodes that are not in the system are included in the DODAG.

In Example 7, the subject matter of Example 6 optionally includes wherein a node that is in the system is included in multiple DODAGs.

In Example 8, the subject matter of any one or more of Examples 5-7 optionally include wherein the objective function prioritizes at least one of power conservation or traffic congestion mitigation.

In Example 9, the subject matter of any one or more of Examples 2-8 optionally include wherein, to propagate the organizational element to the second network, the processing circuitry communicates a DODAG Information Object (DIO) to the second network.

In Example 10, the subject matter of Example 9 optionally includes wherein the DIO includes a DIO option field that includes a group parameter, the group parameter used by an objective function in a node to ascertain other nodes with a same group.

In Example 11, the subject matter of any one or more of Examples 1-10 optionally include wherein the second network operates in accordance with an IEEE 802.15.4e family of standards.

In Example 12, the subject matter of any one or more of Examples 1-11 optionally include wherein the first network operates in accordance with an Open Connectivity Foundation (OCF) family of standards.

In Example 13, the subject matter of Example 12 optionally includes wherein the system definition is an OCF collection.

In Example 14, the subject matter of any one or more of Examples 12-13 optionally include wherein all operations are performed by a device operating as an OCF server.

In Example 15, the subject matter of Example 14 optionally includes wherein the OCF server is an OCF gateway.

Example 16 is a method for creating a computing system, the method comprising: receiving a system definition, the system definition including function identifiers and pertaining to a first network; obtaining an organizational element based on the system definition, the organizational element pertaining to a second network that is a self-organizing network; propagating the organizational element to the second network to modify the topology of the second network to create a system of nodes in the second network in accordance with the system definition; receiving a request from the first network for the system; and fulfilling the request by interacting with the nodes.

In Example 17, the subject matter of Example 16 optionally includes Routing Protocol for Low-Power and Lossy Networks (RPL).

In Example 18, the subject matter of Example 17 optionally includes wherein obtaining the organizational element based on the system definition includes obtaining a RPL instance that corresponds to the system definition.

In Example 19, the subject matter of Example 18 optionally includes wherein obtaining the RPL instance includes creating the RPL instance.

In Example 20, the subject matter of any one or more of Examples 18-19 optionally include wherein the RPL includes an objective function, the objective function accepting environmental parameters of a node and providing a ranking of other nodes to attach as parents in a Destination-Oriented Directed Acyclic Graph (DODAG).

In Example 21, the subject matter of Example 20 optionally includes wherein nodes that are not in the system are included in the DODAG.

In Example 22, the subject matter of Example 21 optionally includes wherein a node that is in the system is included in multiple DODAGs.

In Example 23, the subject matter of any one or more of Examples 20-22 optionally include wherein the objective function prioritizes at least one of power conservation or traffic congestion mitigation.

In Example 24, the subject matter of any one or more of Examples 17-23 optionally include wherein propagating the organizational element to the second network includes communicating a DODAG Information Object (DIO) to the second network.

In Example 25, the subject matter of Example 24 optionally includes wherein the DIO includes a DIO option field that includes a group parameter, the group parameter used by an objective function in a node to ascertain other nodes with a same group.

In Example 26, the subject matter of any one or more of Examples 16-25 optionally include wherein the second network operates in accordance with an IEEE 802.15.4e family of standards.

In Example 27, the subject matter of any one or more of Examples 16-26 optionally include wherein the first network operates in accordance with an Open Connectivity Foundation (OCF) family of standards.

In Example 28, the subject matter of Example 27 optionally includes wherein the system definition is an OCF collection.

In Example 29, the subject matter of any one or more of Examples 27-28 optionally include wherein all operations are performed by a device operating as an OCF server.

In Example 30, the subject matter of Example 29 optionally includes wherein the OCF server is an OCF gateway.

Example 31 is at least one machine readable medium including instructions that, when executed by processing circuitry, cause the processing circuitry to perform any method of Examples 16-30.

Example 32 is a system including means to perform any method of Examples 16-30.

Example 33 is at least one machine readable medium including instructions for creating a computing system, the instructions, when executed by processing circuitry, cause the processing circuitry to perform operations comprising: receiving a system definition, the system definition including function identifiers and pertaining to a first network; obtaining an organizational element based on the system definition, the organizational element pertaining to a second network that is a self-organizing network; propagating the organizational element to the second network to modify the topology of the second network to create a system of nodes in the second network in accordance with the system definition; receiving a request from the first network for the system; and fulfilling the request by interacting with the nodes.

In Example 34, the subject matter of Example 33 optionally includes Routing Protocol for Low-Power and Lossy Networks (RPL).

In Example 35, the subject matter of Example 34 optionally includes wherein obtaining the organizational element based on the system definition includes obtaining a RPL instance that corresponds to the system definition.

In Example 36, the subject matter of Example 35 optionally includes wherein obtaining the RPL instance includes creating the RPL instance.

In Example 37, the subject matter of any one or more of Examples 35-36 optionally include wherein the RPL includes an objective function, the objective function accepting environmental parameters of a node and providing a ranking of other nodes to attach as parents in a Destination-Oriented Directed Acyclic Graph (DODAG).

In Example 38, the subject matter of Example 37 optionally includes wherein nodes that are not in the system are included in the DODAG.

In Example 39, the subject matter of Example 38 optionally includes wherein a node that is in the system is included in multiple DODAGs.

In Example 40, the subject matter of any one or more of Examples 37-39 optionally include wherein the objective function prioritizes at least one of power conservation or traffic congestion mitigation.

In Example 41, the subject matter of any one or more of Examples 34-40 optionally include wherein propagating the organizational element to the second network includes communicating a DODAG Information Object (DIO) to the second network.

In Example 42, the subject matter of Example 41 optionally includes wherein the DIO includes a DIO option field that includes a group parameter, the group parameter used by an objective function in a node to ascertain other nodes with a same group.

In Example 43, the subject matter of any one or more of Examples 33-42 optionally include wherein the second network operates in accordance with an IEEE 802.15.4e family of standards.

In Example 44, the subject matter of any one or more of Examples 33-43 optionally include wherein the first network operates in accordance with an Open Connectivity Foundation (OCF) family of standards.

In Example 45, the subject matter of Example 44 optionally includes wherein the system definition is an OCF collection.

In Example 46, the subject matter of any one or more of Examples 44-45 optionally include wherein all operations are performed by a device operating as an OCF server.

In Example 47, the subject matter of Example 46 optionally includes wherein the OCF server is an OCF gateway.

Example 48 is a device for creating a computing system, the device comprising: means for receiving a system definition, the system definition including function identifiers and pertaining to a first network; means for obtaining an organizational element based on the system definition, the organizational element pertaining to a second network that is a self-organizing network; means for propagating the organizational element to the second network to modify the topology of the second network to create a system of nodes in the second network in accordance with the system definition; means for receiving a request from the first network for the system; and means for fulfilling the request by interacting with the nodes.

In Example 49, the subject matter of Example 48 optionally includes Routing Protocol for Low-Power and Lossy Networks (RPL).

In Example 50, the subject matter of Example 49 optionally includes wherein the means for obtaining the organizational element based on the system definition include means for obtaining a RPL instance that corresponds to the system definition.

In Example 51, the subject matter of Example 50 optionally includes wherein the means for obtaining the RPL instance include means for creating the RPL instance.

In Example 52, the subject matter of any one or more of Examples 50-51 optionally include wherein the RPL includes an objective function, the objective function accepting environmental parameters of a node and providing a ranking of other nodes to attach as parents in a Destination-Oriented Directed Acyclic Graph (DODAG).

In Example 53, the subject matter of Example 52 optionally includes wherein nodes that are not in the system are included in the DODAG.

In Example 54, the subject matter of Example 53 optionally includes wherein a node that is in the system is included in multiple DODAGs.

In Example 55, the subject matter of any one or more of Examples 52-54 optionally include wherein the objective function prioritizes at least one of power conservation or traffic congestion mitigation.

In Example 56, the subject matter of any one or more of Examples 49-55 optionally include wherein the means for the organizational element to the second network include means for communicating a DODAG Information Object (DIO) to the second network.

In Example 57, the subject matter of Example 56 optionally includes wherein the DIO includes a DIO option field that includes a group parameter, the group parameter used by an objective function in a node to ascertain other nodes with a same group.

In Example 58, the subject matter of any one or more of Examples 48-57 optionally include wherein the second network operates in accordance with an IEEE 802.15.4e family of standards.

In Example 59, the subject matter of any one or more of Examples 48-58 optionally include wherein the first network operates in accordance with an Open Connectivity Foundation (OCF) family of standards.

In Example 60, the subject matter of Example 59 optionally includes wherein the system definition is an OCF collection.

In Example 61, the subject matter of any one or more of Examples 59-60 optionally include wherein all operations are performed by a device operating as an OCF server.

In Example 62, the subject matter of Example 61 optionally includes wherein the OCF server is an OCF gateway.

Example 63 is at least one machine-readable medium including instructions, which when executed by a machine, cause the machine to perform operations of any of the operations of Examples 1-62.

Example 64 is an apparatus comprising means for performing any of the operations of Examples 1-62.

Example 65 is a system to perform the operations of any of the Examples 1-62.

Example 66 is a method to perform the operations of any of the Examples 1-62.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for creating a computing system, the device comprising processing circuitry to:
   receive a system definition, the system definition including function identifiers that are indifferent to implementation and pertaining to a first network, wherein the system definition is an Open Connectivity Foundation (OCF) collection in accordance with an OCF family of standards, and wherein the OCF collection defines an OCF group of nodes in a second network;

obtain an organizational element based on the system definition, the organizational element pertaining to the second network that is a self-organizing network;
propagate the organizational element to the second network to modify the topology of the second network to create a system of nodes in the second network in accordance with the system definition, wherein the system of nodes are less than all nodes in the second network and organized as a tree with the device as a root of the tree;
receive a request from the first network for the system, the request received at a single endpoint for the OCF collection hosted by the device; and
fulfill the request by interacting with the nodes through messages communicated through the tree to avoid nodes in the second network from relaying the messages.

2. The device of claim 1, wherein the second network uses a self-organizing facility that uses IPv6 Routing Protocol for Low-Power and Lossy Networks (RPL).

3. The device of claim 2, wherein, to obtain the organizational element based on the system definition, the processing circuitry obtains a RPL instance that corresponds to the system definition.

4. The device of claim 3, wherein, to obtain the organizational element based on the system definition, the processing circuitry creates the RPL instance.

5. The device of claim 3, wherein the RPL includes an objective function, the objective function accepting environmental parameters of a node and providing a ranking of other nodes to attach as parents in a Destination-Oriented Directed Acyclic Graph (DODAG) to create the tree.

6. The device of claim 2, wherein, to propagate the organizational element to the second network, the processing circuitry communicates a DODAG Information Object (DIO) to the second network.

7. The device of claim 6, wherein the DIO includes a DIO option field that includes a group parameter, the group parameter used by an objective function in a node to ascertain other nodes with a same group.

8. The device of claim 1, wherein the first network operates in accordance with the OCF family of standards.

9. A method for creating a computing system, the method comprising:
receiving a system definition by an Open Connectivity Foundation (OCF) gateway, the system definition including function identifiers that are indifferent to implementation and pertaining to a first network, wherein the system definition is an OCF collection in accordance with an OCF family of standards, and wherein the OCF collection defines an OCF group of nodes in a second network;
obtaining, by the OCF gateway, an organizational element based on the system definition, the organizational element pertaining to the second network that is a self-organizing network;
propagating the organizational element to the second network to modify the topology of the second network to create a system of nodes in the second network in accordance with the system definition, wherein the system of nodes are less than all nodes in the second network and organized as a tree with the OCF gateway as a root of the tree;
receiving, at the OCF gateway, a request from the first network for the system, the request received at a single endpoint for the OCF collection hosted by the OCF gateway; and fulfilling, by the OCF gateway, the request by interacting with the nodes through messages communicated through the tree to avoid nodes in the second network from relaying the messages.

10. The method of claim 9, wherein the second network uses a self-organizing facility that uses IPv6 Routing Protocol for Low-Power and Lossy Networks (RPL).

11. The method of claim 10, wherein obtaining the organizational element based on the system definition includes obtaining a RPL, instance that corresponds to the system definition.

12. The method of claim 11, wherein obtaining the RPL instance includes creating the RPL instance.

13. The method of claim 11, wherein the RPL includes an objective function, the objective function accepting environmental parameters of a node and providing a ranking of other nodes to attach as parents in a Destination-Oriented Directed Acyclic Graph (DODAG) to create the tree.

14. The method of claim 10, wherein propagating the organizational element to the second network includes communicating a DODAG Information Object (DIO) to the second network.

15. The method of claim 14, wherein the DIO includes a DIO option field that includes a group parameter, the group parameter used by an objective function in a node to ascertain other nodes with a same group.

16. The method of claim 9, wherein the first network operates in accordance with the OCF family of standards.

17. At least one non-transitory machine readable medium including instructions for creating a computing system, the instructions, when executed by processing circuitry of an Open Connectivity Foundation (OCF) gateway, cause the processing circuitry to perform operations comprising:
receiving a system definition, the system definition including function identifiers that are indifferent to implementation and pertaining to a first network, wherein the system definition is an OCF collection in accordance with an OCF family of standards, and wherein the OCF collection defines an OCF group of nodes in a second network;
obtaining an organizational element, based on the system definition, the organizational element pertaining to the second network that is a self-organizing network;
propagating the organizational element to the second network to modify the topology of the second network to create a system of nodes in the second network in accordance with the system definition, wherein the system of nodes are less than all nodes in the second network and organized as a tree with the OCF gateway as a root of the tree;
receiving a request from the first network for the system the request received at a single endpoint for the OCF collection hosted by the OCF gateway; and
fulfilling the request by interacting with the nodes through messages communicated through the tree to avoid nodes in the second network from relaying the messages.

18. The at least one non-transitory machine readable medium of claim 17, wherein the second network uses a self-organizing facility that uses IPv6 Routing Protocol for Low-Power and Lossy Networks (RPL).

19. The at least one non-transitory machine readable medium of claim 18, wherein obtaining the organizational element based on the system definition includes obtaining a RPL instance that corresponds to the system definition.

20. The at least one non-transitory machine readable medium of claim 19, wherein obtaining the RPL instance includes creating the RPL instance.

21. The at least one non-transitory machine readable medium of claim 19, wherein the RPL includes an objective function, the objective function accepting environmental parameters of a node and providing a ranking of other nodes to attach as parents in a Destination-Oriented Directed Acyclic Graph (DODAG) to create the tree.

22. The at least one non-transitory machine readable medium of claim 18, wherein propagating the organizational element to the second network includes communicating a DODAG Information Object (DIO) to the second network.

23. The at least one non-transitory machine readable medium of claim 22, wherein the DIO includes a DIO option field that includes a group parameter, the group parameter used by an objective function in a node to ascertain other nodes with a same group.

24. The at least one non-transitory machine readable medium of claim 17, wherein the first network operates in accordance with the OCF family of standards.

\* \* \* \* \*

UNITED STATES PATENT AND TRADEMARK OFFICE
CERTIFICATE OF CORRECTION

PATENT NO. : 11,178,017 B2
APPLICATION NO. : 16/608758
DATED : November 16, 2021
INVENTOR(S) : Agerstam et al.

Page 1 of 1

It is certified that error appears in the above-identified patent and that said Letters Patent is hereby corrected as shown below:

In the Claims

In Column 26, Line 10, in Claim 11, delete "RPL," and insert --RPL-- therefor

In Column 26, Line 43, in Claim 17, delete "element," and insert --element-- therefor In Column 26, Line 53, in Claim 17, delete "system" and insert --system,-- therefor Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*